United States Patent Office 3,092,527
Patented June 4, 1963

3,092,527
PROPELLANT MIXING
Willem Schaafsma, Los Altos, Calif., assignor to United Aircraft Corporation, a corporation of Delaware
No Drawing. Filed Oct. 25, 1960, Ser. No. 64,691
1 Claim. (Cl. 149—19)

This invention relates to a method of mixing materials wherein at least one of the materials is a polymeric material of high viscosity or is a polymerizable material which forms a viscous polymer under processing conditions. The invention finds its greatest applicability, and will be described, in the field of mixing solid rocket propellants and explosives. However, the invention is one of broad applicability and may be used in any situation where one wishes to mix a viscous liquid material with other normally solid materials.

Heretofore the mixing of polymeric materials has presented a number of difficulties. Such mixes are ordinarily made in batch-type mixers which run at low speeds. Such low-speed mixers are required to produce adequate mixing during the later stages of mixing when the viscosity of the mixture becomes high. In operating such mixers, the initial mixing is relatively inefficient in the early stages of the mixing when the mixture is relatively fluid. Further, it is necessary to use relatively low-speed mixers to prevent unduly heating the mix since considerable energy is transferred to the mixture. If one attempts to mix heavy viscous materials at high rates of shear, the mixture is heated and the polymerization rate is accelerated with a consequent loss of pot life and the possibility of freeze-up (i.e. polymerization to a solid) in the mixer.

At the present time a rather delicate balance exists between the duration of mixing, the pot life of a mixture, its casting characteristics, and the cure time of a cast material. These characteristics are a function of a system formulation and the processing and temperature history of the mixture. As a result of the final viscous characteristic of the mix, a material loss occurs on dumping the load due to mixture hang-up. This also necessitates frequent cleaning of the mixer to remove partially cured material which might contaminate a subsequent batch.

It is therefore an object of the present invention to provide a process of mixing wherein mixing time can be substantially reduced.

Another object of this invention is to provide a process of mixing wherein materials can be thoroughly mixed which would become viscous too rapidly at room temperature and thus prevent forming a homogeneous mixture.

A further object of this invention is to provide a process of mixing wherein the pot life of the mixed propellant can be extended almost indefinitely.

A still further object of this invention is to provide a mixing technique where there is substantially no loss of material due to hang-up in the mixer, which also eliminates the need for frequent clean-up of equipment between batches.

Still another object of this invention is to provide a mixing technique for propellants or explosives wherein the mixing hazards are greatly reduced.

A still further object of this invention is to provide a mixing technique wherein the mixing time can be adjusted to permit process control enabling corrective measures to be taken prior to casting a batch.

Other objects will be apparent from the specification which follows.

Generally speaking, the objects of the present invention are carried out by freezing at least some of the normally liquid or viscous components of a mixture whereby the frozen material can be ground to the desired fineness by any of the methods which are well known for particle-size reduction of solid materials such as in an impact-type mill.

The following non-limiting examples illustrate embodiments of the present invention as it is applied to the preparation of propellants. Such propellants have been notoriously hard to process in the past since after the mixture has formed, it rapidly becomes viscous and the mixture may set to a hard solid before the desired degree of mixing of the several ingredients can be brought about.

Example 1

In carrying out this example, a propellant can be made containing the following weight percentages of ingredients:

| | Percent |
|---|---|
| Polypropylene glycol | 16.8 |
| Trimethylol propane | .27 |
| Alrosperse | .50 |
| Phenyl beta naphthylamine | .25 |
| Ferric acetyl acetonate | .04 |
| Ammonium perchlorate | 65.00 |
| Aluminum powder | 15.00 |
| Toluene diisocyanate | 2.14 |

Alrosperse is an alkyl naphthalene sulfonate dispersing agent.

A pre-mix was made by blending together the first five of these ingredients while heating to 140° F. Heating to this temperature insures dissolution of the normally solid ingredients (TMP, Alrosperse, PBNA and FeAA). The mixing was performed under vacuum in order to degas the mixture by removing water, entrained air or low boiling liquids. Traces of moisture would result in an undesirable cellular structure in the final product. After thorough mixing, the mixture was cooled to a temperature of about 100–110° F. and the diisocyanate was added. The diisocyanate was added in slight excess of the stoichiometric quantity to compensate for any traces of moisture which which might still be present. Upon completion of the diisocyanate addition, the agitation was stopped and the mixture allowed to polymerize for two hours at a temperature of 96° F. Polymerization was then halted by freezing the mixture to a friable solid such as by the use of a chamber cooled with Dry Ice. Although the freezing point of the above mixture is —49° F., it is desirable to cool the mixture well below the freezing point to insure against a tacky surface condition. In this instance, the mixture was cooled to —65° F. The solid mixture was then ground to the desired degree of fineness which in this instance was less than 300 microns. After the frozen polymer was reduced to the desired particle size, it was dry-blended in conventional dry-blending mixing equipment with the other solids in the final propellant formulation. During the blending operation, the mixture was held in a cooled chamber at a temperature below the melting point of the frozen fuel.

The dry materials are pre-cooled before adding them to the mixture to prevent localized melting.

Example 2

The following example illustrates the application of the present invention to a system employing a plastisol. A mixture was first made containing the following parts by weight:

| | |
|---|---|
| Geon Paste Resin 121 (polyvinyl chloride) | 10 |
| Dibutyl sebacate | 10 |

The above mixture was first thoroughly blended and was then frozen to a friable solid by placing it in a chamber cooled by Dry Ice. The frozen mixture was then ground and mixed with 78.8 parts of ammonium perchlorate and 0.2 part of dibutyl tin dilaurate.

After the ingredients of the propellant mixture are thoroughly blended, they can be handled in various ways. One method is to introduce the finely divided material in the cold dry state into a mold (e.g. a rocket casing) and allow the mixture to warm up under vacuum. After the mixture has melted, it can be cured in the normal manner. Another method is to feed the cold, dry mixture through a combination heat exchanger-mixer or a screw extruder where the fuel melts and entrained air is expelled.

I claim:

A process for preparing a composite solid propellant containing a solid propellant material and a second normally solid oxidizer distributed therein comprising:

(a) initiating polymerization of a propellant material capable of being polymerized under the influence of heat whereby to form a viscous polymeric material;

(b) terminating the polymerization by freezing said viscous polymeric material to a friable solid;

(c) grinding said solid so formed;

(d) adding to the frozen ground solid so formed the said solid oxidizer in particulate form;

(e) and thereafter warming the mixture so formed to reinitiate polymerization to produce said solid propellant having said oxidizer therein.

References Cited in the file of this patent

UNITED STATES PATENTS

| | | |
|---|---|---|
| 2,622,277 | Bonnell et al. | Dec. 23, 1952 |
| 2,706,311 | Durst et al. | Apr. 19, 1955 |
| 2,900,242 | Williams et al. | Aug. 18, 1959 |
| 3,053,709 | Herty | Sept. 11, 1962 |

FOREIGN PATENTS

| | | |
|---|---|---|
| 777,894 | Great Britain | June 26, 1957 |